US005468122A

United States Patent [19]

Van Fossen

[11] Patent Number: 5,468,122

[45] Date of Patent: Nov. 21, 1995

[54] UNIFORM MECHANICAL WET GRAIN UNLOADING SYSTEM

[75] Inventor: Larry Van Fossen, Ames, Iowa

[73] Assignee: Iowa State University Research Foundation, Inc., Ames, Iowa

[21] Appl. No.: 265,914

[22] Filed: Jun. 27, 1994

[51] Int. Cl.[6] .................... B65G 65/30

[52] U.S. Cl. .................... 414/786; 34/181; 34/218; 414/287; 414/310

[58] Field of Search .................... 414/786, 287, 414/305–312, 326; 34/179, 181, 182, 210, 218

[56] References Cited

U.S. PATENT DOCUMENTS

| | | | |
|---|---|---|---|
| 3,487,961 | 1/1970 | Neuenschwander | 414/287 X |
| 3,592,447 | 7/1971 | Steffen | 414/287 X |
| 3,765,547 | 10/1973 | Shivvers | 414/287 X |
| 4,026,426 | 5/1977 | Shivvers | 414/310 X |
| 4,050,163 | 9/1977 | Short | 34/210 X |
| 4,142,302 | 3/1979 | Primus | 34/181 X |
| 4,217,701 | 8/1980 | Matthews | 414/310 X |
| 4,669,941 | 6/1987 | West et al. | 414/310 |
| 4,875,820 | 10/1989 | Lepp et al. | 414/306 |
| 4,914,834 | 4/1990 | Sime | 34/169 |
| 5,167,318 | 12/1992 | Siemens | 414/310 X |

*Primary Examiner*—David A. Bucci
*Attorney, Agent, or Firm*—Henderson & Sturm

[57] ABSTRACT

A process for uniformly removing wet grain in a layer of relatively uniform thickness from a wet grain container. Wet grain charged into the grain container is supported on an perforated or air-pervious floor supported above the bottom of the grain container. A continuous upward flow of ambient air travels in a path through the air-pervious floor and upwardly through the wet grain mass. A layer of wet grain of relatively uniform thickness is removed from the area immediately above the floor and discharged from the grain container for further processing such as heated-air drying.

1 Claim, 1 Drawing Sheet

UNIFORM MECHANICAL WET GRAIN UNLOADING SYSTEM

TECHNICAL FIELD

This invention relates to grain management techniques and more particularly to a process for uniformly discharging wet grain from a wet grain container.

BACKGROUND ART

Holding grain to be dried is a necessary, widely adopted grain management practice that is incorporated into many heated-air grain drying systems. Wet grain is commonly defined as grain having a moisture content above about 14–15%. Many heated-air grain drying systems use hopper bottom grain tanks as wet grain holding bins to supply wet grain to heated-air dryers. These bins generally have storage capacity to hold wet grain for a short duration, usually less than 12 hours.

Some grain holding bins are equipped with aeration systems to move ambient air through the wet grain to prevent it from heating. Low storage capacity and short duration wet grain holding bins generally are not aerated. Consequently, all wet grain should be removed daily from these bins that are not equipped for aeration to prevent the build-up of heat in the grain, resulting in grain quality deterioration. Wet grain can be held for several days in properly aerated and managed wet grain holding bins without significantly impairing the grain's quality. The maximum storage life of grain depends on the wet grain moisture content and grain temperature. The maximum storage life for corn is well documented by research, however, the maximum storage life for other grains can be estimated, but is not well documented. It is commonly recommended that wet corn be dried after being held for one-half the maximum storage life.

Most grain harvested in the fall, such as corn, will not be harvested at a moisture content greater than 26%, and night-time temperatures during harvesting is frequently in the 50° to 60° F. range. When properly aerated, grain temperature will be a few degrees below the night-time ambient temperature. As indicated in the following table, wet shelled corn can be held in a properly operated and managed aerated bin up to approximately one week or longer before it is dried. Dryer and/or colder corn can be held longer.

Maximum Days to Hold Shelled Corn Before Drying*

| Shelled Corn Temperature | % Moisture Content | | | | |
|---|---|---|---|---|---|
| -°F.- | 18 | 20 | 22 | 24 | 26 |
| 50 | 64 | 31 | 18 | 12 | 9 |
| 60 | 28 | 14 | 8 | 5 | 4 |

*The figures in the table are one-half the maximum storage life for shelled corn.

Holding up to a week or more supply of wet grain to be dried is a good grain drying system management practice. The wet grain can be dried during times when grain cannot be harvested because fields are muddy, harvesters need repair, etc. Holding wet grain up to a week or more allows heated-air grain dryers to continue operating even if grain is not being harvested.

A grain holding bin can be any facility structurally adequate to store wet grain. It is usually a hopper bottom grain tank or a cylindrical flat bottom grain storage bin. Grain is normally unloaded from the bottom of wet grain holding bins or tanks. This mode of grain unloading has a common characteristic. The grain at the top surface forms an inverted cone and the grain flow is from the inverted grain surface directly through the grain mass to the bottom grain unloading outlet. Consequently, as wet grain is loaded into the inverted grain surface, that grain flows to the bottom outlet to be removed from the container. The first wet grain loaded into the bin or tank is the last grain to be removed. Unless the wet grain containers are aerated, they should be completely unloaded daily, to prevent a build-up of heat in the wet grain that remains in the bin too long, which causes the grain to deteriorate.

DISCLOSURE OF THE INVENTION

The present invention provides a process for uniformly removing wet grain from a wet grain container. Wet grain charged into the grain container is supported on a perforated or air-pervious floor fixed above the bottom of the grain container. A continuous upward flow of ambient air travels in a path through the perforated floor and upwardly through the wet grain mass to prevent rapid grain temperature increases. A uniform layer of wet grain is removed from the area immediately above the floor and discharged from the grain container for further processing or conditioning such as heated-air drying.

An object of the present invention is the provision of a process for uniform unloading of wet grain from a wet grain container.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
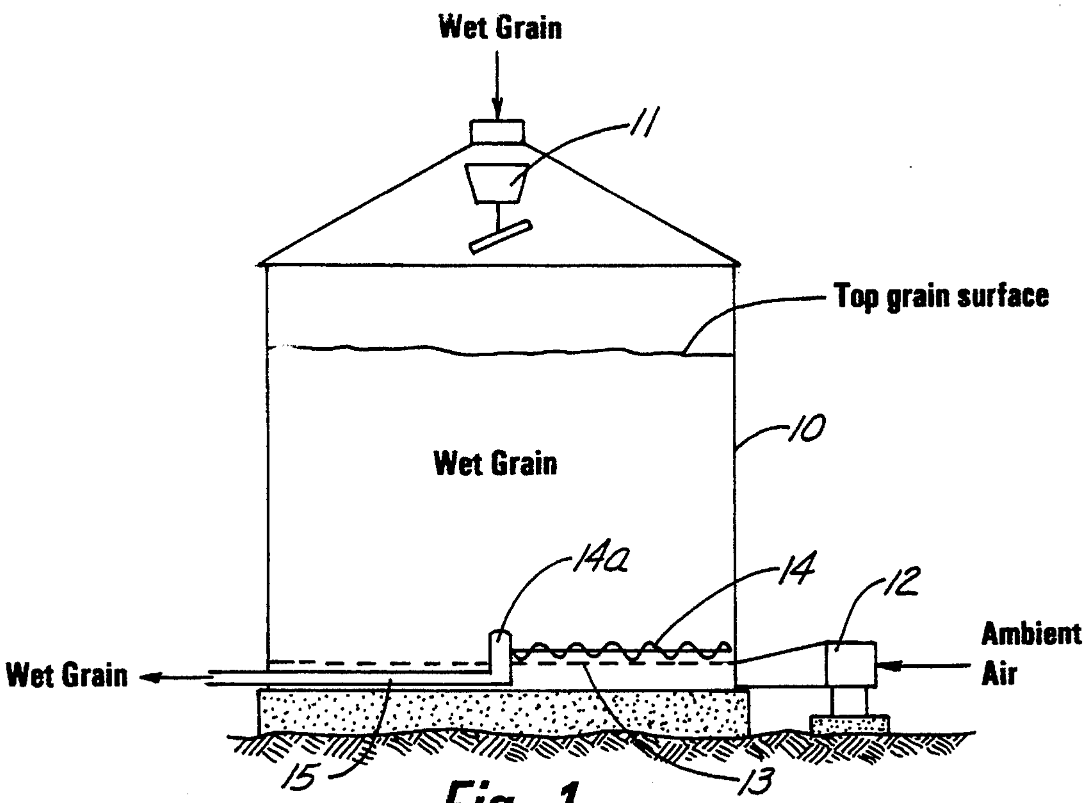
FIG. 1 is a cross-sectional view of a cylindrical flat bottom grain bin equipped to practice the process of the present invention.

Cylindrical flat bottom grain bins (10) can be equipped for wet grain holding with uniform mechanical removal of wet grain from the bottom of the bin (10). The grain conditioning and handling equipment shown in FIG. 1 is available from several manufacturers.

The grain spreading equipment (11) is selected to maintain the grain surface in the bins (10) approximately level. The spreading capacity is equal to or exceeds the maximum capacity of the conveyor delivering wet grain to the bin (10). The fan (12) delivers adequate ambient airflow through the wet grain to prevent a rapid increase in grain temperature. A generally recommended airflow is ½ cfm/bu. (cubic feet of air per minute per bushel) to cool the full grain depth. A full perforated floor (13) is installed in the bin (10) and has adequate plenum space between the concrete floor and perforated floor (13) to permit unrestricted airflow under the perforated floor (13) and for the installation of some of the continuous-flow grain handling equipment (14 and 15). The perforated floor (13) has a sufficient area of openings to permit nearly unrestricted ambient airflow through the floor (13) into and through the wet grain. The continuous-flow equipment includes one or more sweep augers (14) that rotate around the continuous-flow mechanism (14*a*) located in the center of the perforated floor (13). The sweep auger or augers (14) uniformly remove a layer of grain of relatively uniform thickness from immediately above the perforated floor (13) and conveys the grain to the center mechanism (14*a*) where it flows by gravity into the discharge auger (15) located under the perforated floor (13). The discharge auger delivers the wet grain to a conveyor (not shown) that conveys the wet grain to a heated-air grain dryer (not shown).

The conveying capacity of the continuous-flow sweep and discharge auger equipment (14 and 15) is equal to or exceeds the maximum drying capacity of the continuous-flow heated-air grain dryer into which the wet grain is charged.

The conveying capacity of the continuous-flow sweep and discharge auger equipment (14 and 15) supplying wet grain to batch-type heated-air grain dryers should be as high as feasible. An alternative is to convey the wet grain at a conveying capacity slightly greater than the heated-air drying capacity to a gravity unloading tank installed above the dryer. The wet grain can be conveyed or dumped quickly from the tank into the dryer. The holding capacity for the tank should be equal to or slightly higher than the grain dryer batch size.

The operation of the continuous-flow sweep auger or augers (14) and discharge auger (15) are controlled automatically by pressure switches located in the heated-air grain dryer or gravity unloading tank. The switches start the equipment when wet grain is needed and stop the equipment when the dryer or tank is full.

There are several manufacturers of continuous-flow in-bin grain drying equipment which are designed to be installed and used in cylindrical grain bins for grain drying. This equipment can be readily adapted or modified to uniformly remove wet grain from a cylindrical wet grain holding bin (10).

Figure 2:
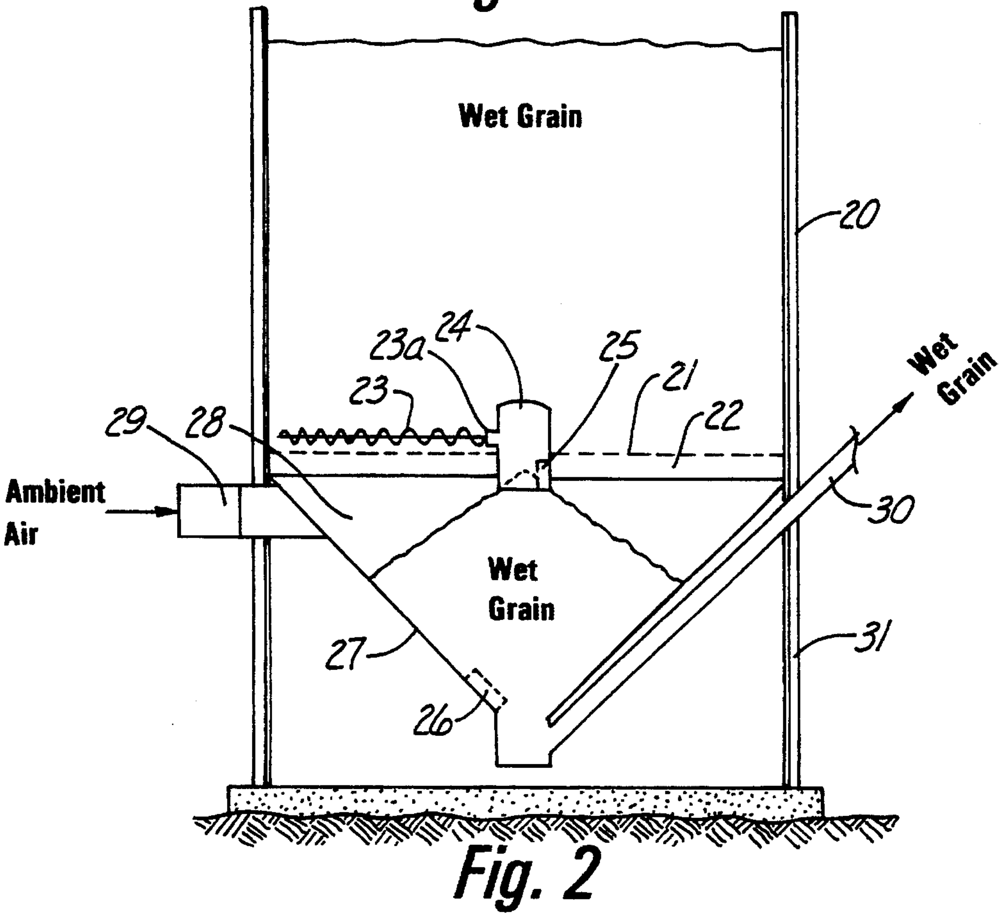
FIG. 2 is a cross-sectional view of a cylindrical hopper bottom tank equipped to practice the process of the present invention.

Cylindrical hopper bottom grain tanks (20), shown in FIG. 2, can be equipped for wet grain holding with uniform mechanical removal of wet grain from the bottom of the tank (20). The grain conditioning and handling equipment shown in FIG. 2 is available or could be modified from several manufacturers of continuous-flow in bin grain drying equipment. A full perforated floor (21) is installed in the tank (20) to permit nearly unrestricted airflow under the perforated floor (21). The perforated floor (21) has a sufficient area of openings to permit nearly unrestricted ambient airflow through the floor (21) into and through the wet grain. The perforated floor supports (22) are fastened to the tank wall and/or support legs (31) properly supported and anchored to prevent a structural failure. They will have adequate strength to support the perforated floor (21) loaded with a full tank depth of wet grain.

The continuous-flow sweep auger or augers (23) rotate around the continuous-flow mechanism located in the center of the perforated floor. They uniformly remove a layer of wet grain of approximately uniform thickness from immediately above the perforated floor (21) and convey it to the center (24) mechanism where it flows by gravity through the mechanism.

The continuous-flow mechanism (24) rotates at the same rate and houses or encloses the mechanism to power the sweep auger or augers (23). The sweep auger or augers (23) convey wet grain through a short tube or tubes (24*a*) fastened to the mechanism (24). The wet grain flows by gravity through the mechanism (24) into the tank hopper (27). The auger or augers (23) and tube or tubes (24*a*) also serve as a grain valve to prevent wet grain from flowing by gravity into the tank hopper (27) which has a slope of about 45° to facilitate the flow of wet grain.

The normally closed pressure switch (25) is located in the base of the continuous-flow mechanism (24) and controls the operation of the sweep auger or augers (23). When the switch (25) is closed, the sweep auger or augers (23) start. When the grain applies pressure to the switch (25), the contacts open and the sweep auger or augers (23) stop.

The operation of the discharge auger (30) is controlled automatically by pressure switches located in the heated-air grain dryer or gravity unloading tank.

When grain applies pressure to the normally closed pressure switch (26), the sweep auger or augers (23) can operate. If the last grain is removed from the hopper (27), the pressure switch (26) opens to stop the sweep auger or augers (23) and discharge auger (30). The void space (28) between the wet grain surface and perforated floor (21) serves as the plenum to permit unrestricted airflow under the perforated floor (21). The fan (29) delivers adequate ambient airflow into the void space (28) and through the perforated floor (21) into the wet grain to prevent rapid grain temperature increases. The discharge auger (30) delivers wet grain to a heated-air grain dryer (not shown).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A process for uniformly removing wet grain from a wet grain container having a top and bottom, the process comprising the steps of:

supporting the wet grain on a horizontal perforated floor disposed above the bottom of the grain container;

providing a continuous upward flow of ambient air in a path through the perforated floor and upwardly through the wet grain in the grain container, wherein the ambient air flow is about ½ cubic feet per minute per bushel of wet grain in the grain container;

removing a layer of wet grain that has relatively uniform thickness from an area immediately above the perforated floor; and discharging the removed wet grain from the grain container.

* * * * *